(12) United States Patent
Hwang et al.

(10) Patent No.: US 11,996,554 B2
(45) Date of Patent: May 28, 2024

(54) HIGH-NICKEL POSITIVE ELECTRODE ACTIVE MATERIAL, PRODUCING METHOD THEREOF, POSITIVE ELECTRODE AND LITHIUM SECONDARY BATTERY COMPRISING THE SAME

(71) Applicant: LG Chem, Ltd., Seoul (KR)

(72) Inventors: Jin Tae Hwang, Daejeon (KR); Dong Hun Lee, Daejeon (KR); Sung Bin Park, Daejeon (KR); Hyung Man Cho, Daejeon (KR); Jung Min Han, Daejeon (KR); Wang Mo Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1035 days.

(21) Appl. No.: 16/700,248

(22) Filed: Dec. 2, 2019

(65) Prior Publication Data

US 2020/0185713 A1    Jun. 11, 2020

(30) Foreign Application Priority Data

Dec. 10, 2018   (KR) .................. 10-2018-0158014

(51) Int. Cl.

| H01M 4/50 | (2010.01) |
|---|---|
| H01M 4/505 | (2010.01) |
| H01M 4/52 | (2010.01) |
| H01M 4/525 | (2010.01) |
| H01M 10/05 | (2010.01) |
| H01M 10/0525 | (2010.01) |
| H01M 4/02 | (2006.01) |

(52) U.S. Cl.
CPC ........... H01M 4/505 (2013.01); H01M 4/525 (2013.01); H01M 10/0525 (2013.01); *H01M 2004/028* (2013.01)

(58) Field of Classification Search
CPC .. H01M 4/505; H01M 4/525; H01M 10/0525; H01M 2004/028
See application file for complete search history.

(56) References Cited

U.S. PATENT DOCUMENTS

| 8,021,785 | B2 * | 9/2011 | Wakasugi | H01M 4/485 |
|---|---|---|---|---|
| | | | | 429/223 |
| 10,714,747 | B2 * | 7/2020 | Kim | H01M 4/366 |
| 2013/0175469 | A1 * | 7/2013 | Paulsen | H01M 4/505 |
| | | | | 252/182.1 |
| 2014/0087262 | A1 | 3/2014 | Imahashi et al. | |
| 2014/0113194 | A1 * | 4/2014 | Tsunozaki | H01M 4/505 |
| | | | | 429/231.95 |
| 2018/0183046 | A1 | 6/2018 | Jin et al. | |
| 2018/0212281 | A1 * | 7/2018 | Roy | H01M 10/0567 |
| 2019/0084887 | A1 * | 3/2019 | Yamamoto | C04B 35/634 |
| 2019/0123350 | A1 | 4/2019 | Choi et al. | |
| 2019/0165362 | A1 | 5/2019 | Baek et al. | |
| 2020/0044246 | A1 * | 2/2020 | Park | H01M 4/405 |
| 2020/0203778 | A1 * | 6/2020 | Yoo | H01M 4/622 |
| 2021/0391578 | A1 * | 12/2021 | Wang | C01G 53/42 |

FOREIGN PATENT DOCUMENTS

| JP | 2003017055 | * | 1/2003 | ............ H01M 10/05 |
|---|---|---|---|---|
| JP | 2003017055 A | | 1/2003 | |
| JP | 2005243536 A | | 9/2005 | |
| KR | 20140016314 A | | 2/2014 | |
| KR | 20150090963 A | | 8/2015 | |
| KR | 20160045029 A | | 4/2016 | |
| KR | 20160063982 A | | 6/2016 | |
| KR | 20180077081 A | | 7/2018 | |
| KR | 101892612 B1 | | 8/2018 | |
| KR | 20180090211 A | | 8/2018 | |
| KR | 20180094567 A | | 8/2018 | |
| WO | WO 2017022222 | * | 2/2017 | ............ H01M 4/364 |

* cited by examiner

*Primary Examiner* — Maria Laios
*Assistant Examiner* — Angela J Martin
(74) *Attorney, Agent, or Firm* — Lerner David LLP (57) ABSTRACT

A method for producing a high-nickel positive electrode active material, a positive electrode active material produced thereby, and a positive electrode and a lithium secondary battery including the same is provided. The method includes preparing a lithium composite transition metal oxide having a nickel content of 80 atm % or greater among transition metals, washing the lithium composite transition metal oxide, and mixing the washed lithium composite transition metal oxide with an aluminum raw material and heat treating the mixture at a temperature of 650° C. to 690° C. to obtain a positive electrode active material having a surface portion doped with aluminum.

11 Claims, 4 Drawing Sheets

HIGH-NICKEL POSITIVE ELECTRODE ACTIVE MATERIAL, PRODUCING METHOD THEREOF, POSITIVE ELECTRODE AND LITHIUM SECONDARY BATTERY COMPRISING THE SAME

CROSS-REFERENCE TO RELATED APPLICATION

The present application claims the benefit of Korean Patent Application No. 10-2018-0158014, filed on Dec. 10, 2018 in the Korean Intellectual Property Office, the disclosure of which is incorporated herein in its entirety by reference.

TECHNICAL FIELD

The present invention relates to a high-nickel positive electrode active material having a nickel content of 80 atm % or greater, a producing method thereof, and a positive electrode and a lithium secondary battery including the positive electrode active material. More specifically, the present invention relates to a high-nickel positive electrode active material doped with aluminum on the surface thereof at a high concentration, thereby having high structural stability, and a producing method thereof.

BACKGROUND ART

In recent years, with the popularization of mobile devices and electric power tools and the increasing demand for environmentally friendly electric vehicles, the requirements for an energy source driving the same are gradually increasing. In particular, there is a demand for developing a positive electrode active material having stable driving and long-life properties under high energy density and high voltage.

As a positive electrode active material of a lithium secondary battery, a lithium transition metal composite oxide is used. Among such lithium transition metal composite oxides, a lithium cobalt composite metal oxide such as $LiCoO_2$, which has a high functional voltage and excellent capacity properties, has been mainly used. However, $LiCoO_2$ is very poor in thermal properties due to the destabilization of a crystal structure according to de-lithium, and is also expensive. Therefore, $LiCoO_2$ has a limitation in being used as a power source in a field such as an electric vehicle or the like in a large amount.

As a material to replace $LiCoO_2$, a lithium manganese composite metal oxide ($LiMnO_2$ or $LiMn_2O_4$, and the like), a lithium iron phosphate compound ($LiFePO_4$ and the like), or a lithium nickel composite metal oxide ($LiNiO_2$ and the like) has been developed. However, when compared with $LiCoO_2$, $LiNiO_2$ is poor in thermal stability, and when an internal short circuit occurs due to external pressure or the like in a charged state, a positive electrode active material itself is decomposed, thereby causing the rupture and ignition of a battery.

Accordingly, as a method for improving the thermal stability of $LiNiO_2$, which is low, while maintaining the excellent reversible capacity thereof, a nickel cobalt manganese-based lithium composite transition metal oxide in which a part of Ni is substituted with Mn and Co (hereinafter, simply referred to as an 'NCM-based lithium oxide') has been developed. However, typical NCM-based lithium oxides which have been developed up to the present have insufficient capacity, so that there has been a limitation in the application thereof.

In order to overcome such limitations, in recent years, studies have been conducted to increase the content of Ni in an NCM-based lithium oxide to improve the capacity properties of a positive electrode active material. In recent years, high-nickel positive electrode active materials containing Ni in an amount of 80 atm % or greater in all transition metals are being developed. However, such high-nickel positive electrode active materials have a problem in that the structural stability of the active material is rapidly reduced when overcharged or exposed to a high temperature, so that performance is rapidly deteriorated or cell stability is lowered.

Accordingly, there is a demand for developing a new technology capable of producing a high-nickel positive electrode active material which has high capacity and is excellent in stability even when overcharged or exposed to a high temperature.

PRIOR ART DOCUMENT

Patent Document

Korean Patent Laid-open Publication No. 10-2016-0063982 (Date of publication: Jun. 7, 2016)

DISCLOSURE OF THE INVENTION

Technical Problem

An aspect of the present invention provides a positive electrode active material having excellent thermal stability while having a nickel content of 80 atm % or greater, and a producing method thereof.

Technical Solution

According to an aspect of the present invention, there is provided a method for producing a high-nickel positive electrode active material, the method including preparing a lithium composite transition metal oxide having a nickel content of 80 atm % or greater among transition metals, washing the lithium composite transition metal oxide, and mixing the washed lithium composite transition metal oxide with an aluminum raw material and heat treating the mixture at a temperature of 650° C. to 690° C. to obtain a positive electrode active material having a surface portion doped with aluminum.

According to another aspect of the present invention, there is provided a positive electrode active material having an average composition represented by Formula 2 below and having a concentration gradient in which the doping concentration of Al gradually decreases from the surface of the positive electrode active material toward the center thereof.

[Formula 1]

In Formula 2, M is one or more selected from the group consisting of W, Cu, Fe, Ba, V, Cr, Ti, Zr, Zn, In, Ta, Y, La, Sr, Ga, Sc, Gd, Sm, Ca, Ce, Nb, Mg, B, and Mo, and 0.9≤x≤1.5, 0.8≤y<1.0, 0<z<0.2, 0<w<0.2, 0.001≤v≤0.05, and 0≤u≤0.02.

According to yet another aspect of the present invention, there are provided a positive electrode and a lithium secondary battery including the high-nickel positive electrode active material of the present invention described above.

Advantageous Effects

As in the present invention, when a positive electrode active material is produced by washing a high-nickel lithium composite transition metal oxide and then adding an aluminum raw material thereto, followed by firing in a specific temperature range, it is possible to obtain a high-nickel positive electrode active material having a surface portion doped with aluminum at a high concentration.

The high-nickel positive electrode active material having a surface portion heavily doped with aluminum has superior thermal stability to a typical high-nickel positive electrode active material. Accordingly, a lithium secondary battery applied with the high-nickel positive electrode active material of the present invention exhibits excellent overcharge stability and high-temperature lifespan properties.

BEST MODE FOR CARRYING OUT THE INVENTION

It will be understood that words or terms used in the specification and claims of the present invention shall not be construed as being limited to having the meaning defined in commonly used dictionaries. It will be further understood that the words or terms should be interpreted as having meanings that are consistent with their meanings in the context and the technical idea of the invention, based on the principle that an inventor may properly define the meaning of the words or terms to best explain the invention.

In the present specification, the atomic fraction of each element constituting a positive electrode active material may be measured by X-ray photoelectron spectroscopy (XPS), and at this time, ESCALAB 250 ESCA of Thermo Fisher Scientific Corporation was used as a measuring device.

In the present specification, "doping" means a state in which a doping element is substituted for a transition metal (that is, nickel, manganese, and cobalt) site in a lithium composite transition metal oxide, and the term is different from "coating" in which a doping element is not substituted for a transition metal site but reacts with lithium on the surface of a lithium composite transition metal oxide and thus is present in the form of a composite.

Also, in the present specification, % means wt % unless otherwise stated.

Hereinafter, the present invention will be described in more detail.

The present inventors have repeatedly conducted research on developing a high-nickel positive electrode active material excellent in stability even when overcharged or exposed to a high temperature. As a result, the present inventors have found that it is possible to produce a positive electrode active material having a high doping content of aluminum on a surface portion of the positive electrode active material by washing a lithium composite transition metal oxide having a nickel content of 80 atm % or greater among transition metals, and then adding an aluminum raw material thereto, followed by firing at a specific temperature. Also, the present inventors have found that the high-nickel positive electrode active material having a high doping content of aluminum on a surface portion thereof is excellent in thermal stability when compared with a typical high-nickel positive electrode active material, and thus, may implement excellent overcharge stability and high-temperature lifespan properties when applied to a lithium secondary battery, and have completed the present invention.

<Method for Producing Positive Electrode Active Material>

First, a method for producing a positive electrode active material according to the present invention will be described.

The method for producing a positive electrode active material of the present invention includes (1) preparing a lithium composite transition metal oxide having a nickel content of 80 atm % or greater in all transition metals, (2) washing the lithium composite transition metal oxide, and (3) mixing the washed lithium composite transition metal oxide with an aluminum raw material and heat treating the mixture at a temperature of 650° C. to 690° C. to obtain a positive electrode active material having a surface portion doped with aluminum.

Hereinafter, each step of the producing method of the present invention will be described in more detail.

(1) Preparing Lithium Composite Transition Metal Oxide

First, a lithium composite transition metal oxide having a nickel content of 80 atm % or greater in all transition metals is prepared.

Specifically, the lithium composite transition metal oxide may be a lithium nickel cobalt manganese oxide represented by [Formula 1] below.

$$Li_aNi_bCo_cMn_dM_eO_2 \qquad \text{[Formula 1]}$$

In Formula 1, M is a doping element substituted for a transition metal site of the lithium composite transition metal oxide, and is one or more selected from the group consisting of W, Cu, Fe, Ba, V, Cr, Ti, Zr, Zn, In, Ta, Y, La, Sr, Ga, Sc, Gd, Sm, Ca, Ce, Nb, Mg, B, and Mo, and $0.9 \leq a \leq 1.5$, $0.8 \leq b < 1.0$, $0 < c < 0.2$, $0 < d < 0.2$, and $0 \leq e \leq 0.02$.

Specifically, a represents the atomic fraction of lithium in the lithium composite transition metal oxide, and a may be 0.9 to 1.5, preferably 0.9 to 1.2.

b represents the atomic fraction of nickel in all transition metals included in the lithium composite transition metal oxide, and b may be 0.8 to less than 1, preferably 0.8 to 0.99, more preferably 0.8 to 0.95, and even more preferably 0.85 to 0.95. When the atomic fraction of nickel is high as described above, high capacity properties may be implemented.

c represents the atomic fraction of cobalt in all transition metals included in the lithium composite transition metal oxide, and c may be greater than 0 to less than 0.2, preferably 0.001 to 0.18, and more preferably 0.01 to 0.15.

d represents the atomic fraction of manganese in all transition metals included in the lithium composite transition metal oxide, and d may be greater than 0 to less than 0.2, preferably 0.001 to 0.18, and more preferably 0.01 to 0.15.

e represents the atomic fraction of a doping element M in all transition metals included in the lithium composite transition metal oxide, and e may be 0 to 0.02.

Specific examples of the lithium composite transition metal oxide may be $Li[Ni_{0.8}Co_{0.1}Mn_{0.1}]O_2$, Li[Ni$_{0.85}$Co$_{0.1}$Mn$_{0.5}$]O$_2$, Li[Ni$_{0.9}$Co$_{0.05}$Mn$_{0.05}$]O$_2$, and the like, but are not limited thereto.

The lithium composite transition metal oxide as described above may be a commercially available one purchased, or may be prepared using a method for preparing a lithium composite transition metal oxide known in the art.

For example, the lithium composite transition metal oxide may be prepared by mixing a transition metal precursor and a lithium-containing raw material, followed by firing.

The transition metal precursor may be a hydroxide, an oxyhydroxide, a carbonate, or an organic complex of a composite transition metal including nickel, cobalt, and manganese.

The transition metal precursor may be a commercially available one purchased and used, or may be prepared according to a method for preparing a transition metal precursor well known in the art.

For example, the transition metal precursor may be prepared by adding a metal solution containing a nickel-containing raw material, a cobalt-containing raw material, and a manganese-containing raw material, optionally a doping element M-containing raw material, with an ammonium cation-containing complex formation agent and a basic compound, and subjecting the mixture to a co-precipitation reaction.

The nickel-containing raw material may be, for example, an acetate, a nitrate, a sulfate, a halide, a sulfide, a hydroxide, an oxide, or an oxyhydroxide, and the like, all containing nickel, specifically Ni(OH)$_2$, NiO, NiOOH, NiCO$_3$.2Ni(OH)$_2$.4H$_2$O, NiC$_2$O$_2$.2H$_2$O, Ni(NO$_3$)$_2$.6H$_2$O, NiSO$_4$, NiSO$_4$.6H$_2$O, a fatty acid nickel salt, a nickel halide, or a combination thereof, but is not limited thereto.

The cobalt-containing raw material may be an acetate, a nitrate, a sulfate, a halide, a sulfide, a hydroxide, an oxide, or an oxyhydroxide, and the like, all containing cobalt, specifically Co(OH)$_2$, CoOOH, Co(OCOCH$_3$)$_2$.4H$_2$O, Co(NO$_3$)$_2$.6H$_2$O, Co(SO$_4$)$_2$.7H$_2$O, or a combination thereof, but is not limited thereto.

The manganese-containing raw material may be an acetate, a nitrate, a sulfate, a halide, a sulfide, a hydroxide, an oxide, or an oxyhydroxide, and the like, all containing manganese, specifically a manganese oxide such as Mn$_2$O$_3$, MnO$_2$, Mn$_3$O$_4$, and the like, a manganese salt such as manganese acetate, dicarboxylic acid manganese, citric acid manganese, and fatty acid manganese salt, oxyhydroxide, manganese chloride, or a combination thereof, but is not limited thereto.

The M-containing raw material may be an acetate, a nitrate, a sulfate, a halide, a sulfide, a hydroxide, an oxide, or an oxyhydroxide, and the like, all containing the element M.

The metal solution may be prepared by adding a nickel-containing raw material, a cobalt-containing raw material, and a manganese-containing raw material to a solvent, specifically water or a mixed solvent of water and an organic solvent which can be uniformly mixed with water (for example, alcohol, etc.). Alternatively, the metal solution may be prepared by mixing an aqueous solution of a nickel-containing raw material, an aqueous solution of a cobalt-containing raw material, an aqueous solution of a manganese-containing raw material.

The ammonium cation-containing complex formation agent may be, for example, NH$_4$OH, (NH$_4$)$_2$SO$_4$, NH$_4$NO$_3$, NH$_4$Cl, CH$_3$COONH$_4$, NH$_4$CO$_3$, or a combination thereof, but is not limited thereto. Meanwhile, the ammonium cation-containing complex formation agent may be used in the form of an aqueous solution. At this time, water, or a mixture of an organic solvent which may be uniformly mixed with water (for example, alcohol, etc.) and water may be used as a solvent.

The basic compound may be a hydroxide of an alkali metal or an alkaline earth metal such as NaOH, KOH or Ca(OH)$_2$, a hydrate thereof, or a combination thereof. The basic compound may also be used in the form of an aqueous solution. At this time, water, or a mixture of an organic solvent which may be uniformly mixed with water (for example, alcohol, etc.) and water may be used as a solvent.

The basic compound is added to control the pH of a reaction solution, and may be added in an amount such that the pH of the metal solution becomes 10.5 to 13, preferably 11 to 13.

Meanwhile, the co-precipitation reaction may be performed in an inert atmosphere, for example, in a nitrogen atmosphere or in an argon atmosphere, and the like, at a temperature of 40° C. to 70° C. In addition, in order to increase the reaction rate during the reaction, a stirring process may be selectively performed. At this time, the stirring rate may be 100 rpm to 2000 rpm.

Transition metal precursor particles are generated by the above process and precipitated in a reaction solution. The precipitated transition metal precursor particles are separated according to a typical method and dried to obtain a transition metal precursor.

The transition metal precursor obtained as described above may be mixed with a lithium-containing raw material and then fired to prepare a lithium composite transition metal oxide.

At this time, the lithium-containing raw material may be a carbonate (for example, lithium carbonate and the like), a hydrate (for example, lithium hydroxide hydrate (LiOH.H$_2$O) and the like), a hydroxide (for example, lithium hydroxide and the like), a nitrate (such as lithium nitrate (LiNO$_3$) and the like) and a chloride (such as lithium chloride (LiCl) and the like), and the like, all containing lithium, and any one thereof or a mixture of two or more thereof may be used.

Meanwhile, the mixing of the transition metal precursor and the lithium-containing raw material may be performed by solid state mixing such as jet milling, and the mixing ratio of the transition metal precursor and the lithium-containing raw material may be determined to be in a range satisfying the atomic fraction of each component in a positive electrode active material to be finally produced.

Next, the firing may be performed at 600° C. to 1000° C., preferably 700° C. to 900° C., and may be performed for 5-30 hours, preferably 8-15 hours. However, the temperature and the duration of the firing are not limited thereto.

(2) Washing

When a lithium composite transition metal oxide is prepared, the lithium composite transition metal oxide is washed.

Unlike a lithium composite transition metal oxide having a low nickel content, in the case of the lithium composite transition metal oxide having a high nickel content used in the present invention, a lithium by-product such as LiOH and Li$_2$CO$_3$ remains in a large amount on the surface of the lithium composite transition metal oxide in a manufacturing process, and the lithium by-product reacts with an electrolyte or the like during the operation of a battery and causes the generation of gas, swelling, and the like. Therefore, the lithium by-product on the surface of the lithium composite transition metal oxide must be removed by performing a washing process.

The washing may be performed by introducing the lithium composite transition metal oxide to a cleaning liquid and then stirring the same. At this time, the cleaning liquid may be, for example, pure water, water, and the like, but is not limited thereto.

The temperature of the washing may be 5° C. to 25° C., and the duration of the washing may be 10 minutes to 3 hours. When the temperature and the duration of the washing satisfy the above ranges, the lithium by-product may be effectively removed.

When the washing step is completed, a step of drying the washed lithium composite transition metal oxide may be performed. At this time, the temperature of the drying may be, for example, 110-250° C. and the duration of the washing may be 30 minutes to 5 hours, but are not limited thereto.

(3) Obtaining Positive Electrode Active Material Doped with Aluminum on Surface Portion Thereof Next, the washed lithium composite transition metal oxide is mixed with an aluminum raw material, and then the mixture is heat treated to obtain a positive electrode active material having a surface portion doped with aluminum.

At this time, the aluminum raw material may be an aluminum-containing acetate, an aluminum-containing nitrate, an aluminum-containing sulfate, an aluminum-containing halide, an aluminum-containing sulfide, an aluminum-containing hydroxide, an aluminum-containing oxide, an aluminum-containing oxyhydroxide, or a mixture thereof. For example, the aluminum raw material may be $Al_2O_3$, $Al(OH)_3$, $AlSO_4$, $AlCl_3$, Al-isopropoxide, $AlNO_3$, AlF, or a combination thereof, but is not limited thereto. Among the above, $Al_2O_3$ is particularly preferable.

Meanwhile, it is preferable that the aluminum raw material is mixed in an amount of 0.05-1 part by weight, preferably 0.01-0.6 parts by weight, based on 100 parts by weight of the washed lithium composite transition metal oxide. When the mixing amount of the aluminum raw material is less than 0.05 parts by weight, the effect of improving the structural stability of a positive electrode active material is insignificant. When greater than 1 part by weight, the capacity properties of a positive electrode active material may be deteriorated.

Meanwhile, it is preferable that the washed lithium composite transition metal oxide and the aluminum raw material is dry-mixed. When a wet-mixing method using a solvent is used, lithium is melt from the surface of the lithium composite transition metal oxide by the solvent used during the mixing, thereby increasing residual lithium and forming an inert rock salt phase on the surface, so that capacity may be reduced.

In addition, the heat treatment is performed at a temperature of 650° C. to 690° C., preferably 670° C. to 690° C. When the temperature of the heat treatment satisfies the above range, a positive electrode active material doped with aluminum on the surface thereof at a high concentration may be obtained. Specifically, when the heat treatment temperature is less than 650° C., the reaction between the introduced aluminum and the surface of an active material is reduced, so that only a small amount of aluminum contributes to the formation of a coating layer while most of the aluminum is not doped or coated on the surface. In this case, the effect of improving the structural stability of the positive electrode active material is greatly reduced. Also, when the heat treatment temperature is greater than 690° C., aluminum is diffused into the inside of a positive electrode active material, so that it is hard to maintain a high doping concentration on the surface portion of the positive electrode active material. When aluminum is doped on a central portion of a positive electrode active material, not on the surface portion thereof, there may be problems in that structural stability may be somewhat improved, but lifespan properties are deteriorated and resistance is increased.

In addition, the heat treatment may be performed for 1-10 hours, preferably 3-8 hours. When the heat treatment duration is too short, aluminum doping may not be sufficiently achieved. When too long, the concentration of aluminum on a particle surface portion may be reduced.

In addition, it is preferable that the heat treatment is performed in an oxygen atmosphere. When the heat treatment is performed in an atmosphere in which oxygen partial pressure is low, due to the de-intercalation of oxygen from the particle surface, rock salt phase, which is an electrochemical inert phase, is formed on the particle surface, thereby greatly increasing surface resistance. In contrast, when the heat treatment is performed in an oxygen atmosphere, aluminum may be doped on the surface of the particle without changing the structure of the particle surface.

Through the process described above, a positive electrode active material having a surface portion doped with aluminum at a high concentration may be produced.

Meanwhile, after the process is completed, if necessary, a process of forming a coating layer on the surface of the positive electrode active material may be further performed. The process of forming a coating layer may be performed using a typical process of coating a positive electrode active material well known in the art. However, the method is not particularly limited. For example, the coating layer may be formed by mixing a positive electrode active material and a coating raw material, and then heat treating the mixture in a temperature range of 100° C.-600° C., preferably 300° C.-500° C. for 1-15 hours, preferably 3-8 hours.

At this time, the coating raw material may be an oxide, a hydroxide, an oxyhydroxide, a carbonate, a sulfate, a halide, a sulfide, an acetate, or a carboxylate, or a combination thereof, all containing a coating element, and the coating element may be one or more elements selected from the group consisting of Al, Ti, W, B, F, P, Mg, Ni, Co, Fe, Cr, V, Cu, Ca, Zn, Zr, Nb, Mo, Sr, Sb, Bi, Si, and S, but are not limited thereto.

<Positive Electrode Active Material>

The positive electrode active material of the present invention produced as described above is doped with aluminum on a surface portion of the positive electrode active material at a high concentration, and thus, is excellent in structural stability.

Specifically, the positive electrode active material according to the present invention has an average composition represented by Formula 2 below, and the doping concentration of Al gradually decreases from the surface of the positive electrode active material toward the center of the positive electrode active material.

[Formula 2]

In Formula 2, M is a doping element substituted for a transition metal site of the lithium composite transition metal oxide, and is one or more selected from the group consisting of W, Cu, Fe, Ba, V, Cr, Ti, Zr, Zn, In, Ta, Y, La, Sr, Ga, Sc, Gd, Sm, Ca, Ce, Nb, Mg, B, and Mo, and $0.9 \leq x \leq 1.5$, $0.8 \leq y < 1.0$, $0 < z < 0.2$, $0 < w < 0.2$, $0.001 \leq v \leq 0.05$, and $0 \leq u \leq 0.02$.

Specifically, x represents the atomic fraction of lithium in the positive electrode active material, and x may be 0.9 to 1.5, preferably 0.9 to 1.2.

y represents the atomic fraction of nickel in all transition metals included in the positive electrode active material, and y may be 0.8 to less than 1, preferably 0.8 to 0.99, more preferably 0.8 to 0.95, and even more preferably 0.85 to 0.95. When the atomic fraction of nickel is high as described above, high capacity properties may be implemented.

z represents the atomic fraction of cobalt in all transition metals included in the positive electrode active material, and z may be greater than 0 to less than 0.2, preferably 0.001 to 0.18, and more preferably 0.01 to 0.15.

w represents the atomic fraction of manganese in all transition metals included in the positive electrode active material, and w may be greater than 0 to less than 0.2, preferably 0.001 to 0.18, and more preferably 0.01 to 0.15.

v represents the atomic fraction of aluminum in all transition metals included in the positive electrode active material, and v may be 0.001 to 0.05, preferably 0.003 to 0.02.

u represents the atomic fraction of a doping element M in all transition metals included in the positive electrode active material, and u may be 0 to 0.02.

Meanwhile, Formula 2 above represents the average composition of each component included in the entire positive electrode active material, and depending on the position thereof inside the positive electrode active material, the fraction of each component may be different from Formula 2 above. For example, in the present invention, since aluminum is intensively doped on a surface portion of the positive electrode active material, on the surface portion of the positive electrode active material, the atomic fraction of the aluminum may be higher than that described in Formula 2 above, and on a central portion of the positive electrode active material, the atomic fraction of the aluminum may be lower than that described in Formula 2 above. That is, the positive electrode active material of the present invention has a concentration gradient in which the doping concentration of Al gradually decreases from the surface of the positive electrode active material toward the center thereof. According to the research of the present inventors, when a positive electrode active material has a concentration gradient in which the doping concentration of Al gradually decreases from the surface of the positive electrode active material toward the center thereof, it is possible to prevent the crystal structure of a high-nickel positive electrode active material from rapidly collapsing at a high temperature or in an overcharged state, so that overcharge stability and high-temperature lifespan properties may be significantly improved.

Specifically, in the positive electrode active material of the present invention, the atomic fraction of Al in all transition metals may be 2 atm % or greater, preferably 2 atm % to 15 atm %, at a depth of 50 nm or less from the surface of the positive electrode active material. When the atomic fraction of aluminum in all transition metals satisfies the above range at a depth of 50 nm or less from the surface of the positive electrode active material, it is more effective for improving the thermal stability of a high-nickel positive electrode active material.

Meanwhile, the atomic fraction of Al may be measured by an XPS method, and means a value defined by Equation (1) below.

Atomic fraction of Al (atm %)={Number of Al atoms/(Total number of atoms of Ni, Co, Mn and Al)}×100         Equation (1)

Meanwhile, the positive electrode active material according to the present invention may further include a coating layer including at least one coating element selected from the group consisting of one or more elements selected from the group consisting of Al, Ti, W, B, F, P, Mg, Ni, Co, Fe, Cr, V, Cu, Ca, Zn, Zr, Nb, Mo, Sr, Sb, Bi, Si, and S. When the coating layer is included as described above, the contact between the positive electrode active material and an electrolyte is suppressed, thereby reducing the occurrence of a side reaction. Therefore, when applied to a battery, lifespan properties may be improved, and furthermore, the filling density of the positive electrode active material may be increased.

When a coating element is further included as described above, the content of the coating element in the coating layer may be 100 ppm to 10,000 ppm, preferably 200 ppm to 5,000 ppm based on the total weight of the positive electrode active material. When the content of the coating element satisfies the above range, the occurrence of a side reaction with an electrolyte is more effectively suppressed, and when applied to a battery, the lifespan properties of the battery may be further improved.

The coating layer may be formed on the entire surface or on a portion of the surface of the positive electrode active material. Specifically, when the coating layer is formed on a portion of the surface of the positive electrode active material, the coating layer may be formed in an area of 5% to less than 100%, preferably 20% to less than 100% of the total surface area of the positive electrode active material.

<Positive Electrode and Secondary Battery>

The positive electrode active material according to the present invention may be usefully used in manufacturing a positive electrode for secondary battery.

Specifically, a positive electrode according to the present invention includes the positive electrode active material according to the present invention. More specifically, the positive electrode includes a positive electrode current collector and a positive electrode active material layer formed on the positive electrode current collector. At this time, the positive electrode active material layer may include the positive electrode active material according to the present invention. The detailed description of the positive electrode active material according to the present invention is the same as described above, and thus, a detailed description thereof will be omitted.

The positive electrode may be manufactured according to a typical method for manufacturing a positive electrode except that the positive electrode active material according to the present invention is used. For example, the positive electrode may be manufactured by manufacturing a positive electrode mixture by dissolving or dispersing components constituting a positive electrode active material layer, which are a positive electrode active material, a conductive material and/or a binder, in a solvent, applying the mixture on at least one surface of a positive electrode current collector, followed by drying and then roll-pressing. Alternatively, the positive electrode may be manufactured by casting the positive electrode mixture on a separate support, and then laminating a film obtained by being peeled off from the support on the positive electrode current collector.

At this time, the positive electrode current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the positive electrode current collector to improve the adhesion of a positive electrode active material. For example, the positive electrode current collector may be used in various forms such as a film, a sheet, a foil, a net, a porous body, a foam, and a non-woven body.

On at least one surface of the current collector, a positive electrode active material layer including the positive electrode active material according to the present invention, and when necessary, further including at least one of a conductive material or a binder optionally is disposed.

The positive electrode active material may be included in an amount of 80-99 wt %, more specifically 85-98 wt % based on the total weight of the positive electrode active material layer. When included in the above content range, excellent capacity properties may be exhibited.

The conductive material is used to impart conductivity to an electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used. The conductive material may be included in an amount of 1 wt % to 30 wt % based on the total weight of the positive electrode active material layer.

Also, the binder serves to improve the bonding between positive electrode active material particles and the adhesion between the positive electrode active material and the current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1 wt % to 30 wt % based on the total weight of the positive electrode active material layer.

Meanwhile, a solvent used in preparing a positive electrode mixture may be a solvent commonly used in the art. For example, dimethyl sulfoxide (DMSO), isopropyl alcohol, N-methylpyrrolidone (NMP), acetone, water, and the like may be used alone, or a mixture thereof may be used. The amount of the solvent to be used may be appropriately adjusted in consideration of the applying thickness, preparation yield, viscosity, and the like of a slurry.

Next, a secondary battery according to the present invention will be described.

The secondary battery according to the present invention includes a positive electrode, a negative electrode disposed to face the positive electrode, a separator interposed between the positive electrode and the negative electrode, and an electrolyte. At this time, the positive electrode is the positive electrode according to the present invention described above.

Meanwhile, the secondary battery may further include a battery case for accommodating an electrode assembly composed of the positive electrode, the negative electrode, and the separator, and a sealing member for sealing the battery case, optionally.

In the secondary battery, the negative electrode includes a negative electrode current collector and a negative electrode active material layer disposed on at least one surface of the negative electrode current collector.

The negative electrode may be manufactured according to a typical manufacturing method of a negative electrode known in the art. For example, the negative electrode may be manufactured by manufacturing a negative electrode mixture by dissolving or dispersing components constituting a negative electrode active material layer, which are a negative electrode active material, a conductive material and/or a binder, in a solvent, applying the mixture on at least one surface of a negative electrode current collector, followed by drying and then roll-pressing.

The negative electrode current collector is not particularly limited as long as it has high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode collector may typically have a thickness of 3 μm to 500 μm, and as in the case of a positive electrode current collector, microscopic irregularities may be formed on the surface of the negative electrode current collector to improve the adhesion of the negative electrode active material. For example, the negative electrode current collector may be used in various forms such as a film, a sheet, a foil, a net, a porous body, a foam, and a non-woven body.

As the negative electrode active material, a compound capable of reversible intercalation and de-intercalation of lithium may be used. Specific examples thereof may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, a Si alloy, a Sn alloy, or an Al alloy; a metal oxide which may be doped and undoped with lithium such as $SiO_v(0<v<2)$, $SnO_2$, a vanadium oxide, and a lithium vanadium oxide; or a composite including the metallic compound and the carbonaceous material such as a Si—C composite or a Sn—C composite, and any one thereof or a mixture of two or more thereof may be used. Also, a metal lithium thin film may be used as the negative electrode active material. Furthermore, low crystalline carbon, high crystalline carbon and the like may all be used as a carbon material. Representative examples of the low crystalline carbon may include soft carbon and hard carbon, and representative examples of the high crystalline carbon may include irregular, planar, flaky, spherical, or fibrous natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch derived cokes.

Also, the binder and the conductive material may be the same as those described above in the description of the positive electrode.

Meanwhile, in the secondary battery, the separator is to separate the negative electrode and the positive electrode and to provide a movement path for lithium ions. Any separator may be used without particular limitation as long as it is typically used as a separator in a secondary battery. Particularly, a separator having high moisture-retention ability for an electrolyte as well as low resistance to the movement of electrolyte ions is preferable. Specifically, as the separator, a porous polymer film, for example, a porous polymer film prepared from a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point or polyethylene terephthalate fiber, and the like may be used. Furthermore, a coated separator including a ceramic component or a polymer material may be used to secure heat resistance or mechanical strength, and may be used in a single-layered or a multi-layered structure, selectively.

Meanwhile, the electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the manufacturing of a secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used as the organic solvent.

Any lithium salt may be used as the lithium salt without particular limitation as long as it is typically used in an electrolyte for a lithium secondary battery. For example, $Li^+$ may be included as a positive ion of the lithium salt, and a negative ion thereof may be at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$. Specifically, the lithium salt may include a single material selected from the group consisting of LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, and $LiCH_3SO_3$, or a mixture of two or more thereof.

The content of the lithium salt may be appropriately changed within a typical range in which a lithium salt may be used. Specifically, the lithium salt may be included in an electrolyte in a range of 0.8 M to 3 M, specifically 1 M to 2.5 M.

In the electrolyte, in order to improve the lifespan properties of a battery, suppress the reduction in battery capacity, and improve the discharge capacity of the battery, and the like, various additives may be used in addition to the above electrolyte components. As the additives, for example, a halo-alkylene carbonate-based compound such as difluoroethylene carbonate; or pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may be included, and the above additives may be used alone or in combination. At this time, the additive may be included in an amount of 0.1 wt % to 5 wt % based on the total weight of the electrolyte.

The lithium secondary battery according to the present invention such as described above may be usefully used in portable devices such as a mobile phone, a notebook computer, and a digital camera, and in electric cars such as a hybrid electric vehicle (HEV).

Accordingly, according to another embodiment of the present invention, a battery module including the lithium secondary battery as a unit cell and a battery pack including the battery module are provided.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), or a power storage system.

The external shape of the lithium secondary battery of the present invention is not particularly limited, but may be a cylindrical shape using a can, a square shape, a pouch shape, a coin shape, or the like.

The lithium secondary battery according to the present invention may be used in a battery cell which is used as a power source for a small-sized device, and may also be preferably used as a unit cell for a medium-and-large-sized battery module including a plurality of battery cells.

Hereinafter, examples of the present invention will be described in detail so that those skilled in the art can easily carry out the present invention. The present invention may, however, be embodied in many different forms and is not limited to the examples set forth herein.

Example 1

A lithium composite transition metal oxide $LiNi_{0.83}Co_{0.11}Mn_{0.06}O_2$ was introduced to water, stirred, washed for 30 minutes, and then dried at 150° C.

Thereafter, 100 parts by weight of the washed lithium composite transition metal oxide and 0.1 parts by weight of $Al_2O_3$ were dry-mixed. Then, in an oxygen atmosphere, the mixture was heat treated at 680° C. for 8 hours to obtain a positive electrode active material A having an average composition of $LiNi_{0.827}Co_{0.11}Mn_{0.06}Al_{0.003}O_2$.

Example 2

A positive electrode active material B having an average composition of $LiNi_{0.82}Co_{0.11}Mn_{0.06}Al_{0.01}O_2$ was obtained in the same manner as in Example 1 except that 100 parts by weight of the washed lithium composite transition metal oxide and 0.3 parts by weight of $Al_2O_3$ were dry-mixed.

Example 3

A positive electrode active material C having an average composition of $LiNi_{0.81}Co_{0.11}Mn_{0.06}Al_{0.02}O_2$ was obtained in the same manner as in Example 1 except that 100 parts by weight of the washed lithium composite transition metal oxide and 0.6 parts by weight of $Al_2O_3$ were dry-mixed.

Comparative Example 1

A lithium composite transition metal oxide $LiNi_{0.83}Co_{0.11}Mn_{0.06}O_2$ was introduced to water, stirred, washed for 30 minutes, and then dried at 150° C.

Thereafter, 100 parts by weight of the washed lithium composite transition metal oxide and 0.1 parts by weight of $H_3BO_3$ were mixed. Then, in an oxygen atmosphere, the mixture was heat treated at 300° C. for 6 hours to obtain a positive electrode active material D coated with B.

Comparative Example 2

A transition metal precursor $Ni_{0.83}Co_{0.11}Mn_{0.06}O \cdot OH$, LiOH, and $Al_2O_3$ were mixed at a weight ratio of 78.9:21:0.1 and then the mixture was heat treated at 800° C. for 12 hours to obtain a positive electrode active material E having an average composition of $LiNi_{0.827}Co_{0.11}Mn_{0.06}Al_{0.003}O_2$.

Comparative Example 3

A positive electrode active material F was obtained in the same manner as in Example 1 except that the heat treatment temperature was 630° C.

Comparative Example 4

A positive electrode active material G was obtained in the same manner as in Example 1 except that the heat treatment temperature was 700° C.

Experimental Example 1

The positive electrode active materials A to G respectively prepared in Examples 1 to 3 and Comparative Examples 1 to 4 were etched with argon gas at a rate of 10 nm/s for 1000 seconds, and using an X-ray photoelectron spectroscopy (XPS) method, the Al content (unit: atm %) each thereof according to the duration of etching was measured. The measurement results are shown in Table 1 and FIG. 1 below.

Figure 1:
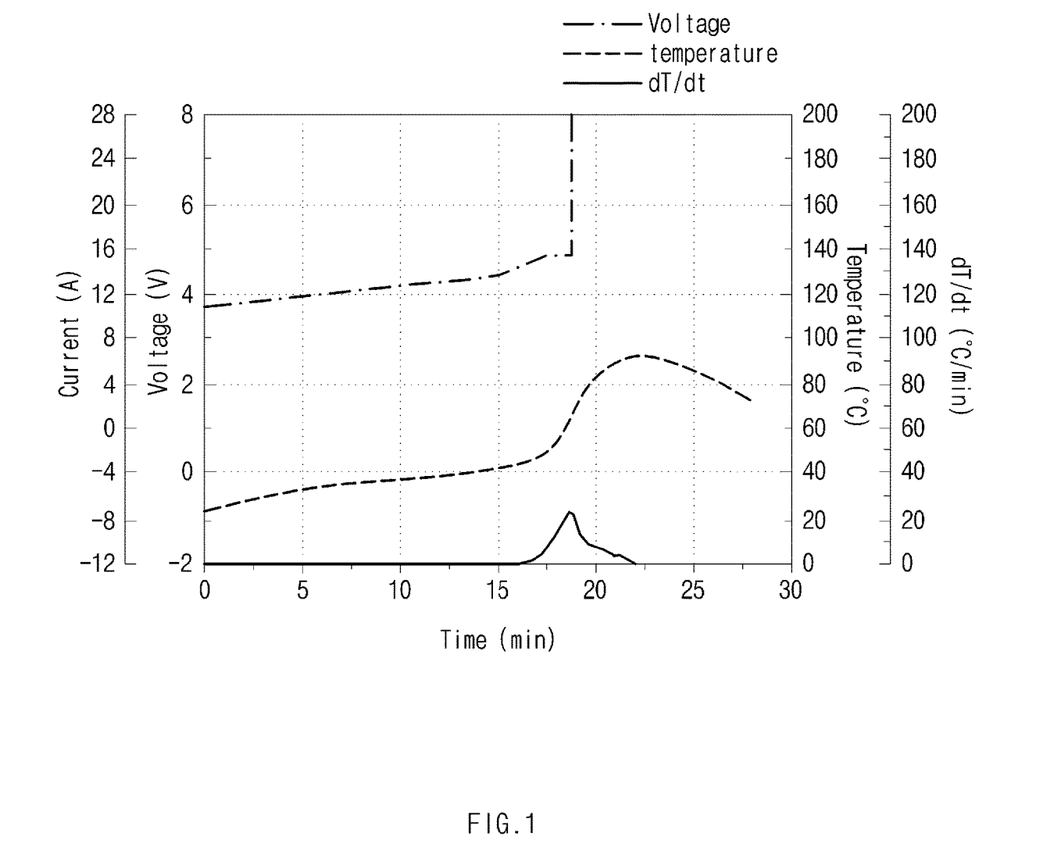
FIG. 1 is a diagram showing the result of overcharge evaluation of a lithium secondary battery including the positive electrode active material of Example 1.

As shown in Table 1, the positive electrode active material produced in each of Examples 1 to 3 had a high atomic fraction of Al in all transition metals, which was 2-15 atm %, at a depth of 50 nm or less from the surface thereof (etching duration 500 seconds). However, the positive electrode active material of each of Comparative Examples 1 to 4 had a very low Al content on a surface portion thereof.

<Manufacturing Lithium Secondary Battery>

The positive electrode active material produced by each of Examples 1 to 3 and Comparative Examples 1 and 4, a carbon black conductive material, and a PVdF binder were mixed in an N-methylpyrrolidone solvent at a weight ratio of 96.5:1.5:2 to prepare a positive electrode mixture material, and the positive electrode mixture material was applied on one surface of an aluminum current collector, dried 130° C., and then roll-pressed to manufacture a positive electrode.

A negative electrode active material, a binder, and a conductive material were mixed in an N-methylpyrrolidone solvent at a weight ratio of 97:1.5:1.5 to prepare a negative electrode mixture material. At this time, artificial graphite was used as the negative electrode active material, carboxymethylcellulose (CMC) was used as the binder, and carbon black was used as the conductive material. The prepared negative electrode mixture material was applied on a copper current collector, dried at 110° C., and then roll-pressed to manufacture a negative electrode.

A separator was interposed between the positive electrode and the negative electrode manufactured as described, and then an electrolyte was injected thereto to manufacture a lithium secondary battery.

Experimental Example 2 Evaluation of Cell Overcharge

The lithium secondary battery applied with the positive electrode active material of each of Examples 1 to 3 and Comparative Examples 1 to 4 produced as described above was subjected to an overcharge evaluation.

The overcharge evaluation was performed by determining whether thermal runaway occurred or not when each lithium secondary battery was charged and discharged three times with a current of 10 A to a voltage range of 2.5-4.2 V and then charged with a current of 9 A. In the overcharge evaluation, the case in which thermal runaway did not occur was indicated as Pass, and the case in which thermal runaway occurred was indicated as Fail.

TABLE 1

| Duration of etching (s) | Example 1 | Example 2 | Example 3 | Comparative Example 2 | Comparative Example 3 | Comparative Example 4 |
|---|---|---|---|---|---|---|
| 0 | 2.8 | 5.04 | 8.68 | 0.002 | 0.01 | 0.001 |
| 10 | 4 | 7.2 | 12.4 | 0.003 | 0.01 | 0.002 |
| 30 | 4.5 | 8.1 | 13.95 | 0.003 | 0 | 0.003 |
| 50 | 4.4 | 7.92 | 13.42 | 0.003 | 0 | 0.002 |
| 100 | 4.3 | 7.74 | 13.11 | 0.003 | 0 | 0.002 |
| 200 | 4.1 | 6.97 | 12.51 | 0.003 | 0 | 0.002 |
| 300 | 3.9 | 6.63 | 11.7 | 0.003 | 0 | 0.002 |
| 500 | 2.6 | 4.42 | 7.8 | 0.003 | 0 | 0.002 |
| 1000 | 0.8 | 1.2 | 2.24 | 0 | 0 | 0 |

The measurement results are shown in [Table 2] below.

TABLE 2

|  | Overcharge stability |
|---|---|
| Example 1 | Pass |
| Example 2 | Pass |
| Example 3 | Pass |
| Comparative Example 1 | Fail |
| Comparative Example 2 | Fail |
| Comparative Example 3 | Fail |
| Comparative Example 4 | Fail |

As shown in Table 2, the lithium secondary battery using the positive electrode active material of each of Examples 1 to 3 had no thermal runaway occurred even when overcharged, thereby having high overcharge stability. However, the lithium secondary battery using the positive electrode active material of each of Comparative Examples 1 to 4 had thermal runaway occurred even when overcharged.

Figure 2:
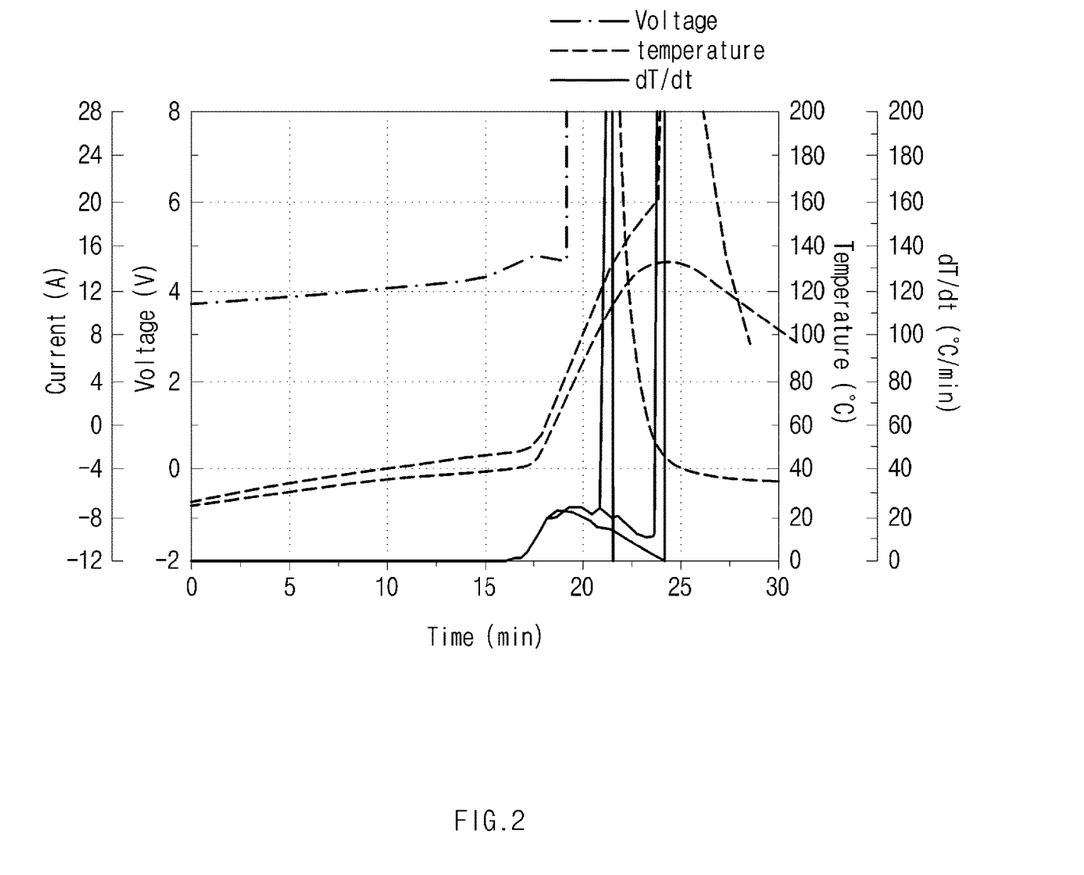
FIG. 2 is a diagram showing the result of overcharge evaluation of a lithium secondary battery including the positive electrode active material of Comparative Example 1.

Meanwhile, FIG. 1 illustrates a graph showing the overcharge evaluation result of the lithium secondary battery manufactured using the positive electrode active material of Example 1, and FIG. 2 illustrates a graph showing the overcharge evaluation result of the lithium secondary battery manufactured using the positive electrode active material of Comparative Example 1. Through FIG. 1 and FIG. 2, it can be confirmed that in the case of the lithium secondary battery using the positive electrode active material of Comparative Example 1, the cell temperature rapidly increased when the battery was overcharged, causing thermal runaway, but in the case of the lithium secondary battery using the positive electrode active material of Example 1, the cell temperature increased and then decreased.

Experimental Example 3: Evaluation of Lifespan Properties

The lithium secondary battery applied with the positive electrode active material of each of Examples 1 to 3 and Comparative Examples 1 to 4 produced as described above was subjected to a lifespan properties evaluation according to the following method.

Each lithium secondary battery was charged to 4.2 V with 0.3 C at 25° C. and discharged to 2.5 V with a constant current of 0.3 C for 30 times each to perform 30 cycles of charge and discharge. The discharge capacity retention rate and the resistance increase rate were measured after the 30$^{th}$ cycle based on the discharge capacity and resistance after the 1$^{st}$ cycle.

TABLE 3

|  | Capacity retention rate [%] | Resistance increase rate [%] |
|---|---|---|
| Example 1 | 92% | 150% |
| Example 2 | 92% | 148% |
| Example 3 | 93% | 145% |
| Comparative Example 1 | 95% | 120% |
| Comparative Example 2 | 89% | 230% |
| Comparative Example 3 | 87% | 220% |
| Comparative Example 4 | 42% | 350% |

As shown in [Table 3], the lithium secondary battery using the positive electrode active material of each of Examples 1 to 3 and the lithium secondary battery using the positive electrode active material of Comparative Example 1 showed excellent lifespan properties. However, the lithium secondary battery using the positive electrode active material of each of Comparative Examples 1 to 4 showed significantly deteriorated lifespan properties.

Figure 3:
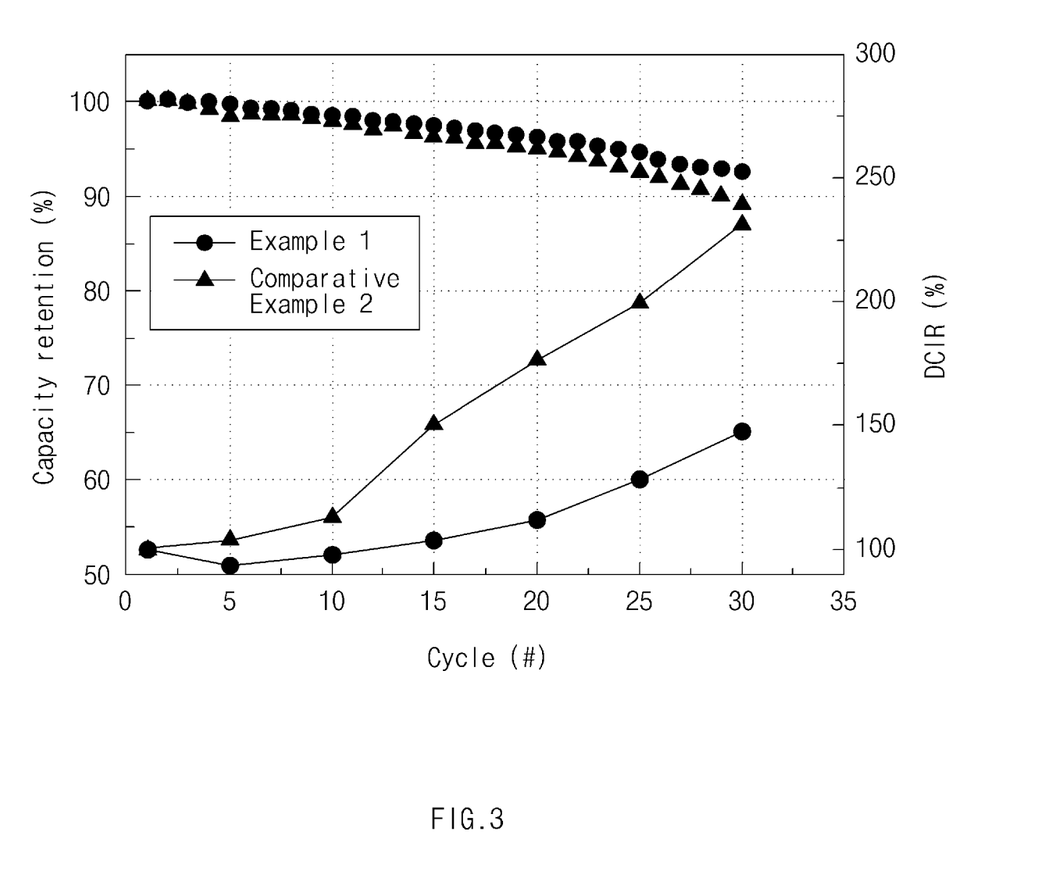
FIG. 3 is a diagram showing the cycle properties of a coin half-cell including the positive electrode active material of Example 1 and Comparative Example 2.

In addition, FIG. 3 illustrates a graph comparing the lifespan properties of the lithium secondary batteries applied with the positive electrode active material of Example 1 and Comparative Example 2, respectively. Through FIG. 3, it can be confirmed that the lithium secondary battery applied with the positive electrode active material of Comparative Example 2 doped by adding an aluminum raw material before washing had a significantly higher resistance increase rate than the lithium secondary battery applied with the positive electrode active material of Example 1.

Experimental Example 4: Evaluation of Caloric Value in Fully Charged State

Figure 4:
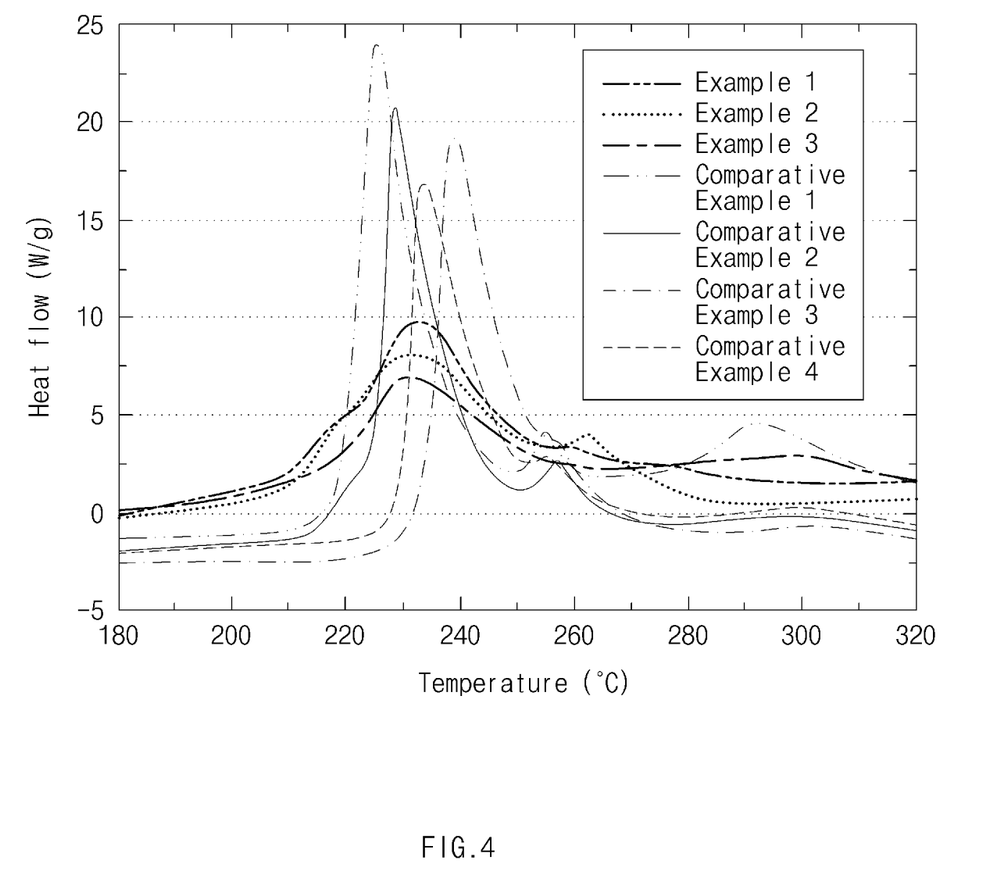
FIG. 4 is a graph comparing the differential scanning calorimetry (DSC) caloric values measured after fully charging positive electrodes respectively including the positive electrode active material of each of Examples 1 to 3 and Comparative Examples 1 to 4.

Using a positive electrode applied with the positive electrode active material of each of Examples 1 to 3 and Comparative Examples 1 to 4 produced as described above and a lithium metal electrode, a coin cell was manufactured. The coin cell was charged and discharged for one time with 0.2 C to a voltage range of 2.5-4.25 V, and then fully charged with 0.2 C to 4.25 V. Thereafter, the coin cell was disassembled to separate the positive electrode, and the separated positive electrode was mounted on a DSC measuring device (HP-DSC, SETARAM Corporation) to measure a caloric value. At this time, the caloric value measurement was performed by raising the temperature to 35° C. to 400° C. at a temperature raising rate of 10° C./min. The measurement results are shown in FIG. 4 below.

As shown in Table 4, the positive electrode applied with the positive electrode active material of each of Examples 1 to 3 had a significantly lower maximum caloric value than the positive electrode applied with the positive electrode active material of each of Comparative Examples 1 to 4. The result shows that the positive electrode active material produced according to the method of the present invention has excellent thermal stability.

The invention claimed is:
1. A method for producing a high-nickel positive electrode active material, comprising:
preparing a lithium composite transition metal oxide having a nickel content of 80 atm % or greater among transition metals;
washing the lithium composite transition metal oxide; and
mixing the washed lithium composite transition metal oxide with an aluminum raw material and heat treating the mixture at a temperature of 650° C. to 690° C. to obtain a positive electrode active material having a surface portion doped with aluminum,
wherein the lithium composite transition metal oxide is represented by [Formula 1] below:

[Formula 1]

in Formula 1, M is one or more selected from the group consisting of W, Cu, Fe, Ba, V, Cr, Ti, Zr, Zn, In, Ta, Y, La, Sr, Ga, Sc, Gd, Sm, Ca, Ce, Nb, Mg, B, and Mo, and 0.9≤a≤1.5, 0.8≤b<1.0, 0<c<0.2, 0<d<0.2, and 0≤e≤0.02.
2. The method of claim 1, wherein the aluminum raw material comprises an aluminum-containing acetate, an aluminum-containing nitrate, an aluminum-containing sulfate, an aluminum-containing halide, an aluminum-containing sulfide, an aluminum-containing hydroxide, an aluminum-containing oxide, an aluminum-containing oxyhydroxide, or a mixture thereof.

3. The method of claim 1, wherein the aluminum raw material is mixed in an amount of 0.05 parts by weight to 1 parts by weight based on 100 parts by weight of the washed lithium composite transition metal oxide.

4. The method of claim 1, wherein the heat treatment is performed in an oxygen atmosphere.

5. The method of claim 1, wherein the mixing is dry-mixing.

6. The method of claim 1, wherein the M is a doping element substituted for a transition metal site of the lithium composite transition metal oxide.

7. A high-nickel positive electrode active material having an average composition represented by Formula 2 below:

$$Li_xNi_yCo_zMn_wAl_vM_uO_2 \quad \text{[Formula 2]}$$

in Formula 2, M is one or more selected from the group consisting of W, Cu, Fe, Ba, V, Cr, Ti, Zr, Zn, In, Ta, Y, La, Sr, Ga, Sc, Gd, Sm, Ca, Ce, Nb, Mg, B, and Mo, and $0.9 \leq x \leq 1.5$, $0.8 \leq y < 1.0$, $0 < z < 0.2$, $0 < w < 0.2$, $0.001 \leq v \leq 0.05$, and $0 \leq u \leq 0.02$, wherein a doping concentration of Al gradually decreases from a surface of the positive electrode active material toward the center thereof, and wherein an atomic fraction of Al in all transition metals is 2 atm % or greater at a depth of 50 nm or less from the surface of the positive electrode active material.

8. The high-nickel positive electrode active material of claim 7, wherein the atomic fraction of Al in all transition metals is 2 atm % to 15 atm % at a depth of 50 nm or less from the surface of the positive electrode active material.

9. A positive electrode comprising the high-nickel positive electrode active material of claim 7.

10. A lithium secondary battery comprising the positive electrode of claim 9.

11. The high-nickel positive electrode active material of claim 7, wherein the M is a doping element substituted for a transition metal site of the lithium composite transition metal oxide.

* * * * *